United States Patent [19]
Blount

[11] Patent Number: 5,433,176
[45] Date of Patent: Jul. 18, 1995

[54] ROTARY-RECIPROCAL COMBUSTION ENGINE

[76] Inventor: David H. Blount, 6728 Del Carro Blvd., San Diego, Calif. 92120

[21] Appl. No.: 91,258

[22] Filed: Jul. 15, 1993

Related U.S. Application Data

[60] Continuation-in-part of Ser. No. 956,269, Oct. 5, 1992, Pat. No. 5,301,637, which is a division of Ser. No. 831,792, Feb. 5, 1992, Pat. No. 5,156,115, which is a division of Ser. No. 560,868, Jul. 31, 1990, Pat. No. 5,152,257.

[51] Int. Cl.⁶ .............................................. F02B 53/00
[52] U.S. Cl. ..................................... 123/45A; 418/68
[58] Field of Search ............... 123/45 A, 45 R; 418/68

[56] References Cited
U.S. PATENT DOCUMENTS

| | | | |
|---|---|---|---|
| 908,916 | 1/1909 | Weinat | 418/68 |
| 1,817,663 | 8/1931 | Ashworth | 418/68 |
| 3,396,709 | 8/1968 | Robicheaux | 123/45 R |

FOREIGN PATENT DOCUMENTS 13677  8/1916  United Kingdom ............ 123/45 A

*Primary Examiner*—John J. Vrablik

[57] ABSTRACT

This invention relates to an apparatus for producing a rotary motion force by means of an external combustion engine, rotary-reciprocal type, consisting of a housing, a sealing mechanism or apparatus, a rotor and a shaft combined with a guiding system for the rotary and reciprocal motions, fuel intake system, exhaust system and an ignition system. This internal combustion engine has many uses which are commonly known but this apparatus may also be used as a compressor, as a pump, as an engine powered by an expanding heating liquid or gas or a combination of the above.

11 Claims, 10 Drawing Sheets

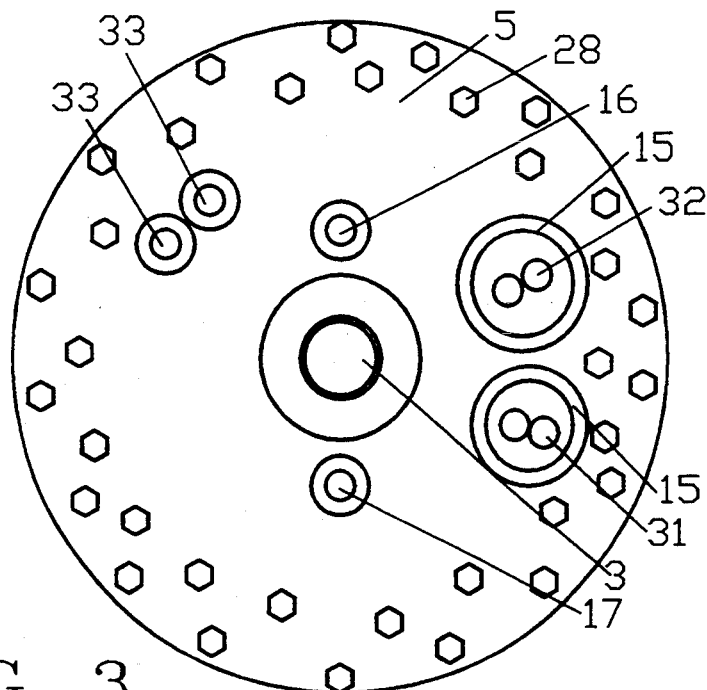
FIG. 3
FIG. 4
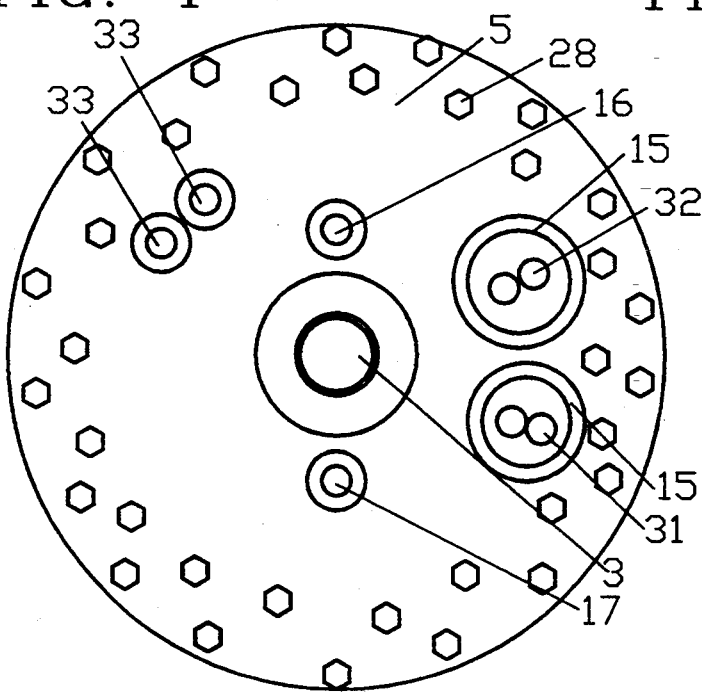
FIG. 5
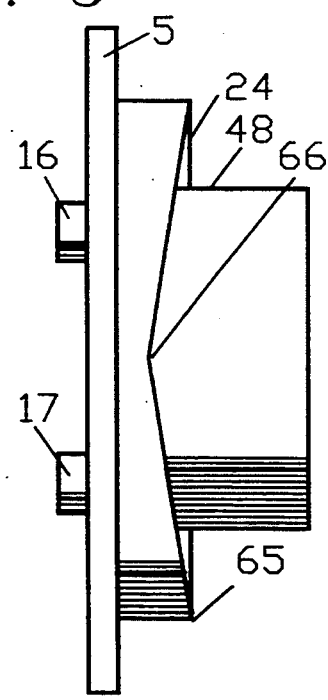

ROTARY-RECIPROCAL COMBUSTION ENGINE

CROSS REFERENCE TO RELATED APPLICATIONS

This application is a continuation in part of my U.S. application Ser. No. 07/956,269 filed Oct. 5, 1992, now U.S. Pat. No. 5,301,637, which is a division of U.S. patent application Ser. No. 07/831,792 filed on Feb. 5, 1992, now U.S. Pat. No. 5,156,115, which is a division U.S. patent application Ser. No. 07/560,868, filed Jul. 31, 1990, now U.S. Pat. No. 5,152,257.

BACKGROUND OF THE INVENTION

The invention relates to an apparatus for producing a rotary motion force by means of an internal combustion engine of the rotary-reciprocal type, provided with a rotor which has circular shaped pistons on the lateral peripheral area of the rotor and which is reciprocately mounted on a rotor with a shaft centrally located in a fixed housing having a cavity formed by a circular peripheral wall and two sidewalls.

Many rotary engines have been invented in the past such as the Agostino Ramilli's water pump, James Watts rotary steam engine, Gilber's engine, Cooley's engine, Selwood engine, Walter engine, Farwell engine, Norcer engine, Porsche rotary engines, Vermel engine, Kauertz engine, Jernal's engine, Greger engine, Franki engine and others.

Previous known rotary engines came in four groups:
1. Scissor actions types with pistons or vanes
2. Eccentric rotor type
3. Eccentric-multi rotor type
4. Revolving-block type Weinat's engine (U.S. Pat. No. 908,916) and Wheatley engine (U.S. Pat. No. 13,677) which are of a rotary-reciprocal type combustion engines which are different from the design of this invention because they have no means to divide the piston into multiple cylinder areas and do not have laterally and peripherally located cylinders and pistons.

The improved engine of this invention is of the novel rotary-reciprocal type wherein the circular pistons or sealing mechanism or apparatus reciprocateon the peripheral area of the rotor while rotating with the rotor and shaft. The rotary and reciprocal motion may be guided by airotary and reciprocal guide. The engine of this invention is entirely different from the four types of engines listed above. This engine differs in design from the engines found in U.S. patent application Ser. Nos. 07/956,269; U.S. Pat. No. 5,301,637 07/831,792, U.S. Pat. No. 5,156,115 and 07/560,868, U.S. Pat. No. 5,152,257, because this engine's pistons and/or sealing mechanism reciprocates on the peripheral area of the rotor and rotates with the rotor.

The basic rotary reciprocal internal combustion engine of this invention consists of a stationary cylindrical housing having laterally and peripherally placed cylinder chambers sidewalls (engine heads), peripherally placed pistons or sealing mechanism with means to reciprocate on the peripheral area of a rotor which is attached to or combined with a shaft centrally located which protrudes out the center of the housing's sidewalls, it may have a reciprocal and rotary guiding system, an ignition system, gases-air mixture intake and exhaust ports. The housing's cylinder chambers are separated by the rotor and pistons or sealing mechanism and closed (sealed) by means of rings on the piston, housing and/or rotor and seals. The cylinder chambers vary in size when the rotor rotates and the piston or sealing mechanism reciprocate and rotate thereby the strokes suction, compression, ignition and exhaustion takes place in the cylinder chambers.

The apparatus of this invention is relatively simple in construction and operation whereby the engine can be produced at relatively low cost. Fewer parts are required in its construction thereby reducing weight. This new engine design should improve the efficiency of the engine's operation and is extremely desirable.

SUMMARY OF THE INVENTION

The object of the present invention is to produce an improved internal combustion engine which is of the rotary-reciprocal type. Another object is to provide a novel apparatus which is a rotary-reciprocal internal combustion engine which may be utilized as a two cycle or as a 4 cycle engine. Another object is to produce an apparatus which has the strokes of suction, compression ignition and exhaustion. Still another object is to produce single or double rotary-reciprocal combustion engines. Another object is to produce multiple arrangements of the rotary-reciprocal internal combustion engines of this invention. Still another object is to produce rotary-reciprocal internal-combustion wherein a piston, divided pistons or solid seals are utilized to divide the combustion chamber into 2 or more sealed chambers. Another object is to produce an apparatus which may be utilized as a compressor, as a pump and as an engine powered by the expansion of heated gases or liquids.

The two cycle and four cycle double rotary-reciprocal internal combustion engines of this invention consist of;

1. housing, a stationary hollow cylindrical housing having a circular cavity which is divided into 3 cavities, a laterally and peripherally placed cylinder chamber on each side (two) and a central chamber. The combustion chamber if. formed with walls consisting of the inner surface peripheral housing wall, the partial inner circular wall which is attached to one side wall (engine head) of the housing and extends parallel with the peripheral wall of the housing toward the center of the housing and starts below the arcuate recesses of the sidewalls leaving room in the housing for the rotor to rotate and the inner surface of the side walls (engine head), these side walls have equally spaced arcuate recesses projecting into the cylinder chambers. The housing has passage ways for discharging combustion gases from the cylinder chamber. The combustion chambers on each side of the double engine are separated from each other by means of the piston or sealing mechanism with ring and/or seals and/or the rotor with rings. There are one or more spark plug ports on each side in the arcuate recesses of the housing and open into the cylinder chambers.

2. rotor, which may be attached to or a part of the shaft. The rotor is circular, and placed in the center of the housing between the inner peripheral walls of the housing and parallel to the walls and rotates with the shaft. The peripheral portion of the rotor has means for the piston and/or sealing mechanism to reciprocate on the rotor while rotating with the rotor.

3. engine shaft, may be a part of or attached to the rotor and in at 90° to the rotors sidewalls. The engine shaft is mounted in the center of the circular housing cavity, passing through the hub of the rotor or a part of it and extending out the side walls of the housing. It rotates with the rotor and has means for pulleys, gears, other engines, etc. to attach to the engine shaft.

4. piston and/or sealing mechanism, the piston consists of a cylindrical piston consisting of a peripheral wall which may have means to guide the reciprocal and rotary motions of the piston and rings and seals bilateral to divide the combustion chambers into sealed chambers; an inner peripheral wall with means to reciprocate on the rotor while rotating with the rotor and may have rings and seals bilateral to divide the combustion chamber into sealed chambers; side walls with equally spaced waves which matches, in shape and number, the arcuate recesses in the cylinder chamber side walls (engine head). The piston and/or sealing mechanism are rotatably and-reciprocally mounted in the combustion chambers of the housing. The piston may be divided into segments equal to the number of waves present and reciprocally individually through the peripheral portion of the rotor and rotatably and reciprocally mounted in the cylinder chamber. The segmented piston has means to divide the combustion chambers into sealed cylinder chamber along with ring and/or seals on the housing, which seals against the rotor. Solid seals which extend from one side of the recessed surface of one combustion chamber wall to the recessed surface of the other combustion chamber wall while also sealing the outer and inner peripheral walls and reciprocating through the peripheral area of the rotor along with seals and/or rings to seal along the rotor may be utilized as the means to divide the combustion chambers into sealed cylinder chambers for the strokes of compression, ignition expansion and exhaustion. Double piston segments or double seals may be utilized with each moving in opposite direction passing through the peripheral area of the rotor while rotating with the rotor and they seal off a portion of the two combustion chambers along with rings or seals on the rotor and sealing against the housing below the cylinder chambers, the seals thereby producing one combustion chamber out of the two opposite combustion chamber to create sealed cylinder chambers.

5. rotary-reciprocal guide consisting of a stationary bearing attached to the housing and a waved rotary-reciprocal guide groove located on the peripheral surface of the piston. The waved side walls of the dividing groove matches, in number and shape, to waved piston's side walls and the equally spaced arcuate recesses of the cylinder chamber side walls. The rotary-reciprocal guide guides the piston in the combustion chambers while keeping the pistons unopened seals in continuous contact with the cylinder chamber's walls and varying the volume of the cylinder chambers enabling a compression of a gaseous mixture to take place after admitting a gaseous mixture to the cylinder chamber. When the piston is divided in segments or a solid seal is utilized to seal the cylinder chamber a guiding system is not necessary because the segmented piston or solid seals are reciprocated by the recessed cylinder chamber wall and guides the seals through the combustion chambers, and the passage (notch) across the peripheral area of the rotor keeps them in place to rotate with the rotor.

6. ignition system, consisting of means for ignition of compressed gaseous mixture for expansion of cylinder chambers due to pressure on the piston and/or sealing mechanism from the combustion products to produce a rotary motion of the rotor and shaft and a reciprocal and rotary motion of the piston and/or sealing mechanism.

The basic engine components of the engine of this invention may be used in a four cycle engine or a double four cycle engine. The four cycle double engines most recessed areas of one combustion chamber is directly opposite to the most recessed area of the other (opposite) combustion chamber. The waves on the piston's side walls (heads) are placed to where the peak of the wave is directly opposite to the valley of the wave on the other side wall of the piston. The piston is mounted, in the combustion chamber wherein on one side the most recessed area fit into the valley of the waves and the peak of the waves fit into the less recessed area of the combustion chambers side wall whereas in the opposite combustion chamber the peak of the waves on the piston's side wall are opposite to the most recessed area of the combustion chamber.

The combustion chambers of the double, 4 cycle engine, may be divided into 2 or more cylinder chambers by means of adding equally spaced and an equal shape and equal number of arcuate recesses to the housing and adding seals to the crest of each wave on the piston. Each chamber is furnished with an intake port or an exhaust port or an ignition means. When one cylinder chamber is for ignition of the compressed fuel-air mixture and the other cylinder chamber is for exhaustion of exhaust gases. When the compressed fuel-air mixture is ignited and this one chamber expands by the heated gas pressure the other cylinder chamber draws in a fuel-air mixture by it being expanded then when the cylinder chambers are compressed the exhaust gases are pushed out and the fuel-air mixture is compressed in the other chamber.

The basic engine components of the engine of this invention may be used in a four cycle double engine wherein the opposite cylinder chambers are not sealed from one another and the gaseous mixture or combustion products may pass from one side to the other and two segmented pistons and solid seals are utilized to seal off these cylinder chambers along with a seal and/or ring on the rotor and seals against the housing (head) below the cylinder chambers. The maximum recessed area of the housing's combustion chamber is placed opposite to the maximum recessed area of the opposite housing's combustion chamber's and the housing's least recessed area is placed opposite to the housing's least recessed area of the opposite combustion chamber. The cylinder chambers are compressed when the double solid seals or double segmented pistons are located in the least recessed area then the cylinder chamber is expanded when the double solid seals or double segmented pistons are located in the maximum recessed area. When one of the connected double cylinder chamber is for ignition of the compressed fuel-air mixture then the other cylinder chamber is for exhaustion of exhaust gases. When the compressed fuel-air mixture is ignited in one double cylinder chamber and this connected double chamber expands by the heated gas pressure while the other connected double cylinder chamber draws in a fuel-air mixture by it being expanded then when the connected double cylinder chambers are compressed the exhaust gases are pushed out and the fuel-air mixture is compressed in the other connected double cylinder chamber. The compressed fuel-air mixture is ignited by 1 or more spark plugs on each cylinder chamber and are fired at the same time. Two or more single or double engines may be attached together by joining the shafts together.

In a 2 cylinder chamber, 4 cycle, double engine, having 4 strokes on each side there are one or more spark plugs for every other cylinder chamber on each engine. The compressed gas-air mixture in one cylinder is ignited and the pressure of the heated gas expands and at the same time the other cylinder on the same side is drawing in a gas-air mixture while expanded. The opposite cylinder is compressing a gaseous-air mixture and the other opposite cylinder is exhausting exhaust gases and the piston is reciprocated toward the opposite sides and the rotor and pistons rotates then the compressed gaseous-air mixture in the opposite cylinder chamber is ignited and the heated gas expands and at the same time the other opposite cylinder chamber draws in a gaseous-air mixture. Then on the other side the gaseous air mixture is compressed and the exhaust gases are exhausted from the other cylinder. There are four ignitions per revolution, two firing on each side of the double engine (2 cylinder, 4 cycle engine). In a 2 cylinder, 4 cycle double rotary reciprocal engine the exhaust port is located near the maximum recessed area of the combustion chamber and on the side that the spark plug is located and the intake port is on the other side of the maximum recessed area of each engine it is preferable to have a one way valve on the exhaust port preventing back flow of the exhaust gases and a one way valve on the intake port to prevent outflow of any exhaust gases.

In a 3 cylinder, 4 cycle double engine, there are 6 strokes on each side and there is one or more spark plugs in one of the cylinder chambers on each side. One cylinder chamber on each side is utilized for ignition, the second cylinder chamber is utilized for exhaustion and the third cylinder chamber is utilized for intake, ignition requires one stroke, exhaustion requires one stroke, suction requires one stroke and compression requires one stroke, giving a total of 4 strokes. There is left a stroke of suction and a stroke of compression on each side of the double engine which may be utilized to compress air for an air assist fuel injection system or used in a two cycle engine to compress a gaseous air mixture to be injected into the opposite cylinder chamber to be compressed for firing or utilized as a compressor. There are 3 ignitions for each side for a total of 6 ignitions per revolution.

A 2 cylinder chamber, 4 cycle single rotary-reciprocal engine has 4 strokes, one for suction, one for expansion, one for compression and one for exhaustion. On the expansion stroke one cylinder chamber is sucking in a gaseous-air mixture while the other cylinder chamber is expanded the ignited hot gases then on the compression stroke the gaseous-air mixture is compressed in one chamber and the exhaust gases are exhausted in the other chamber. One cylinder chamber has 1 or more spark plugs while the other chamber has an exhaust part near the maximum recessed area of the combustion chamber closest to the spark plug and an inlet port near the maximum recessed area of the combustion chamber closest to the spark plug and an inlet port near the maximum recessed area but on the opposite side of the maximum recessed area from where the exhaust port is located. The exhaust port should have a one way valve to prevent inflow and the intake port should have a one way valve preventing outflow. There are two ignitions per revolution. The 4 cycle single rotary-reciprocal engines may have as many cylinder chambers as desired.

A 2 cylinder chamber, 2 cycle engine may utilize the design of a 2 cylinder, 4 cycle double engine by utilizing one engine for the suctioning in of a gaseous-air mixture which is then compressed and passed through an intake port into the cylinder chambers of the other engine when the pistons are at dead center. The exhaust port of the functioning engine is located in the peripheral wall of the housing at a point where the piston is at dead center (maximum expansion of the cylinder chambers). The exhaust gases are exhausted at the same time that the compressed gaseous-air mixture enters the cylinder chambers. There are one or more spark plugs in all cylinder chambers and the ignition takes place at the same time. There are intake ports and exhaust ports located at dead center in all cylinder chambers. There are 2 ignitions per revolution. This 2 cycle engine may be designed to have as many cylinder chambers as desired thereby increasing the amount of ignitions per revolution.

A 4 cylinder, 4 cycle double engine is of the same design as the 2 cylinder, 4 cycle double engine but would have twice as many cylinder chambers, spark plugs, exhaust and intake ports and ignites twice as many times (total of eight ignitions) per revolution. A 6 cylinder, 4 cycle double engine is of the same design as a 3 cylinder, 4 cycle double engine but would have twice as many cylinder chambers (6), spark plugs, exhaust ports and intake ports and ignites twice as many times (total of 12) per revolution. There may also be exhaust ports in the peripheral wall located at the point where the expanded gases have fully expanded (dead center) along with the exhaust ports in the side walls (head). This would relieve some of the exhaust pressure.

A 2 cylinder, 4 cycle double engine with connecting opposite cylinder chambers and a double segmented piston or double solid seals and a ring or seal on the rotor below the cylinders is utilized to seal off the connected cylinder chamber. The maximum recessed area of one housing is directly opposite to the maximum recessed area of the other housing (combustion chamber) and the two chambers acts as a single cylinder chamber, one connected chamber is utilized for ignition and has 1 or more spark plugs on each side. The engine has the strokes of expansion and compression while the other connected cylinder chamber also has the strokes of expansion and compression. When one cylinder chamber is expanding by pressure from hot gases the other cylinder chamber is vacuuming in a gaseous-air mixture then when the cylinder with the exhaust gases is compressed the exhaust gases are exhausted and in the other cylinder the gaseous-air mixture is being compressed while the segmented pistons and/or solid seals are reciprocated and rotated with the rotor and shaft. There are two ignitions per rotation. The spark plugs are located just past the cylinder chambers narrow area and the exhaust port is located just before the next narrowed area of the cylinder chamber then the intake port is located on the opposite side of the narrowed area from the exhaust port. This type of double engine with connected cylinder chambers may have two or more cylinder chambers as desired. One way valve may be utilized on the exhaust ports and intake ports. When an odd number of cylinder chambers are present the one way valves are not necessary.

The compression ratio and the reciprocal stoke is controlled by the design of the waved sides of the pistons and arcuate recesses in the combustion chambers which are equal in number, shape and size. The compression ratio and reciprocal stroke may be designed as desired.

The combustion chambers are formed by the inner surface of the peripheral housing wall, wave surface on the piston front wall with its seals on the crest of the waves, inner surface of the arcuate recesses of the housing wall (head) and the extended inner circular wall of the front wall (head). The combustion chambers are sealed by rings and/or seals.

The fuel systems for this rotary-reciprocal engine may be selected from a fuel pump-carburetor system, direct injection system or an air-assisted fuel system or any other desirable means. Any suitable fuel may be utilized in the engines of this invention, suitable fuels include but are not limited to petroleum fuel, e.g. gasoline, other petroleum distillates, organic gases, e.g. methane, ethane, propaneutane, carbide etc., organic liquids e.g. alcohols such as methanol, ethanol, propanol, etc. hydrogen, coal powder mixed with flammable gases or liquids and mixtures thereof. Gasoline is the preferred fuel.

The cooling system of these rotary-reciprocal engines may be cooled by any suitable means such as by means of a liquid cooling system, by an air cooling system or by a combination of these two systems. In the liquid cooing system the coolant is pumped into chambers around the walls of the cylinder chambers then to a radiator for cooling then back to the engine. Cooling fins may be made into the walls of the cylinder chambers and cooled by air.

The rotor may have a counter balance weight added to the rotor or attached to the shaft. The counter balance weight may useful in 2 cycle single engines or 4 cycle single engines.

DESCRIPTION OF THE DRAWINGS

Other objects of the invention will become apparent upon reading the annexed detail description in connection with the drawing in which:

FIG. 3 is a front view of a 4 cycle, 2 cylinder double engine which functions as a single engine.

FIG. 4 is a front view of a 4 cycle, 2 cylinder double engine.

FIG 5 is a side view of the front wall (head) of FIG. 4 a 4 cycle, 2 cylinder double engine.

DESCRIPTION OF PREFERRED EMBODIMENT

Figure 1:
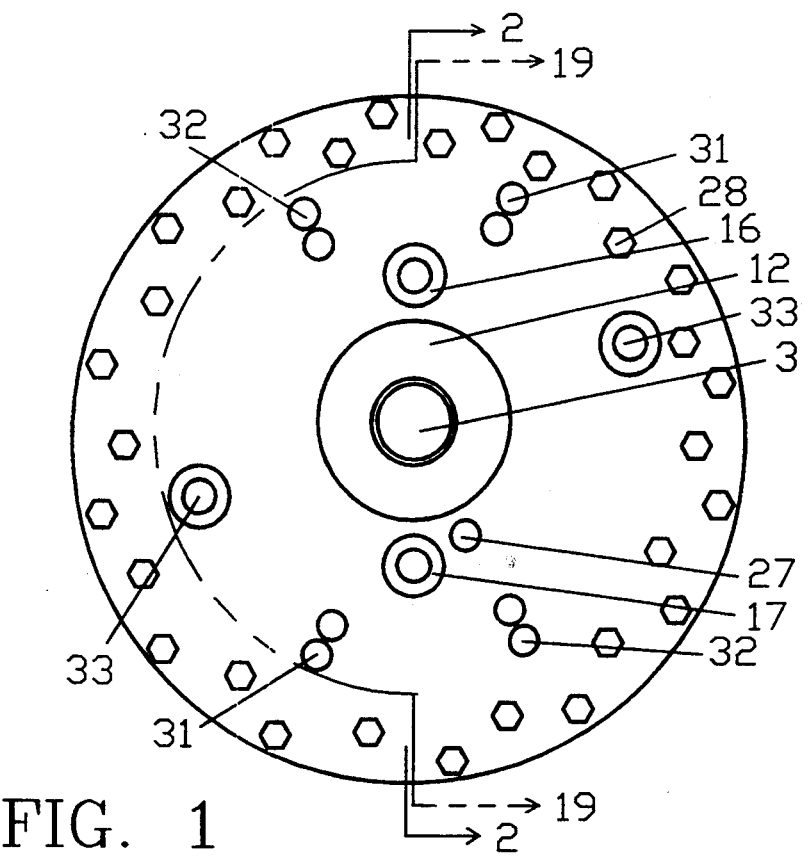
FIG. 1 is a front view of a 4 cycle, 6 cylinder double engine.
Figure 2:
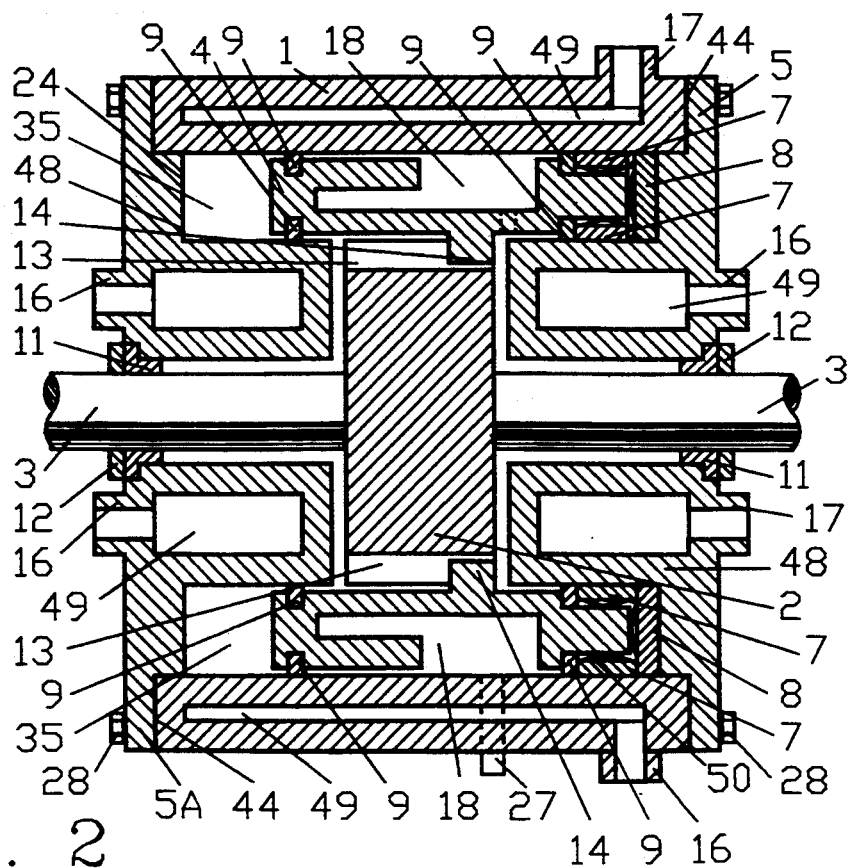
FIG. 2 is a sectional view of FIG. 1, a 4 cycle, 6 cylinder double engine with reciprocal piston.

Referring to the drawings and in particular FIG. 1 and FIG. 2 the rotary-reciprocal engine of the present invention includes an engine housing 1 which has an engine head (side wall) 5 attached to the front of the engine housing by bolts 28 and a gasket 44. The engine shaft 3 is connected to the rotor 2. The shaft has a groove for a pin. The peripheral portion of the rotor has a groove 13 for the projection 14 on the piston to reciprocate through. The piston 4 reciprocates and rotates in the cylinder chambers 35, and has rings 9 and seals 7,8 to seal off the cylinder chambers 35. The piston 4, seals 7,8 and rotor 2 are lubricated through passage ways 27. The rotary motion and reciprocal motion is guided by the wavy groove 18. The housing is cooled by passage of coolant through the inlets 17 into the housing cavities 49 then out the outlets 16. The seals are pressed outward by a spring 50. The shaft exits the heads through bearings 11 and oil seal 12. A gaseous-air mixture is taken in through the intake port 31 and the exhaust is exhausted through the exhaust port 32. The compressed gaseous-air mixture is ignited by spark plugs 47 in the spark plug port 33. The recessed inner surface 24 of the head is of the same shape and size as the front surface 25 of the piston.

There is a coolant intake 17 is a front view of a 4 cycle, 2 cylinder double engine which is basically the same as FIG. 3. Referring to FIG. 5 which is a side view of a head 5 of a 4 cycle, 2 cylinder double engine which has a coolant inlet 17 and a coolant outlet 16. There are two maximum recessed areas 65 opposite each other and two minimum recessed areas 66 opposite each other.

Figure 6:
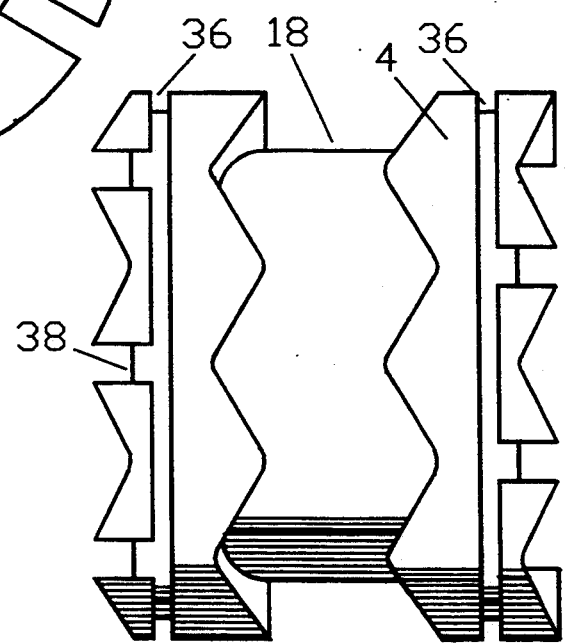
FIG. 6 is a side view of a piston of a 4 cycle, 6 cylinder double engine.
Figure 10:
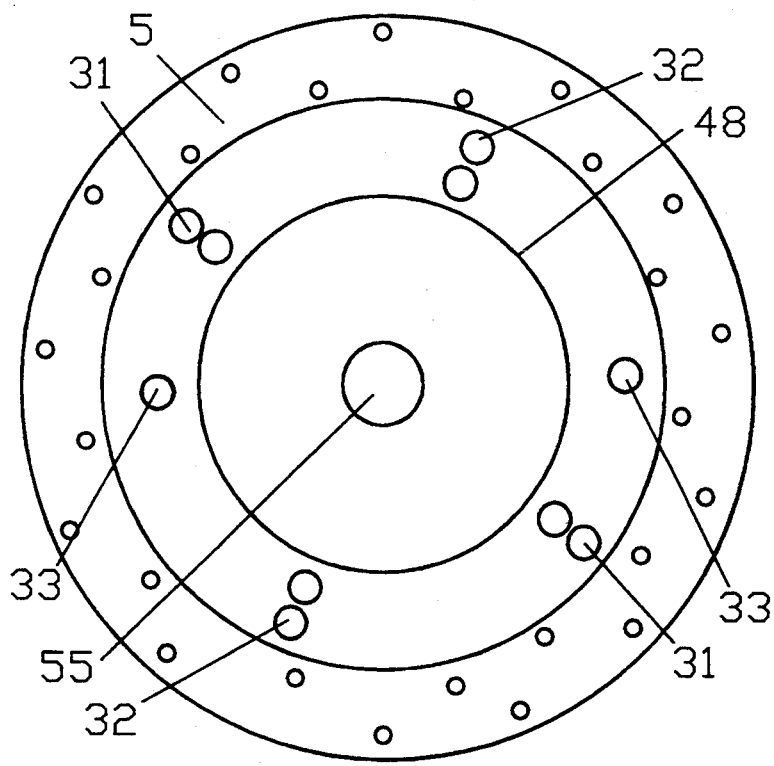
FIG. 10 is an inside view of a front wall (head).

Referring to FIG. 6 which is a side view of a double piston 2 of a 4 cycle, 6 cylinder double engine. The double piston 2 has a rotary and reciprocal guide groove 18 in the center and ring grooves 36 on each side with seal grooves 38.

Figure 7:
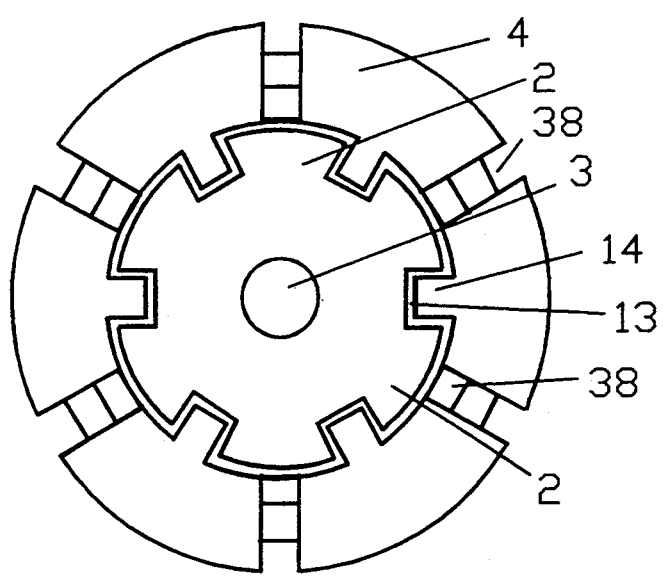
FIG. 7 is a front view of a shaft and rotor with a piston in place.

Referring to FIG. 7 which is a piston 2 with grooves 38 for seals and projecting teeth 14 which fits into a groove 13 in the rotor 2 and reciprocates through this groove. The rotor 2 is attached to a shaft.

Figure 8:
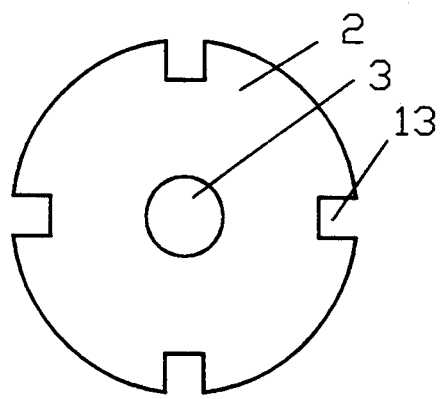
FIG. 8 is a front view of a shaft and rotor.
Figure 9:
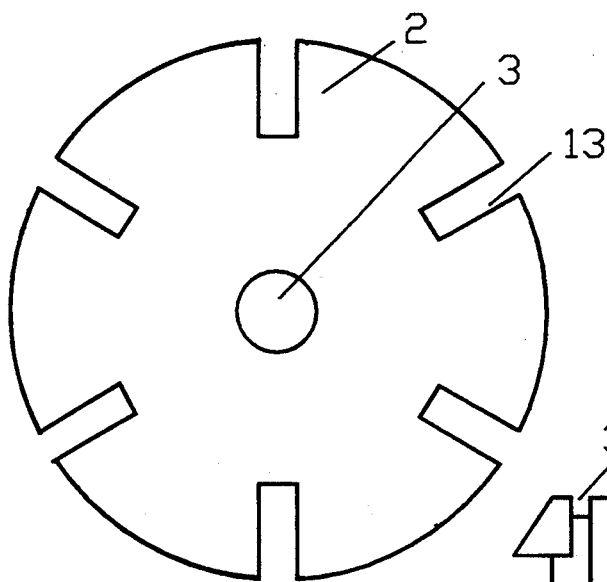
FIG. 9 is a front view of shaft and rotor for a 4 cycle, 6 cylinder chambers with slot for segmented piston or solid seals.

Referring to FIG. 8 which is a rotor 2 and shaft 3, the rotor 2 has slots 13 for the teeth 14 on the piston 2 to reciprocate through as in FIG. 2. FIG. 9 is a rotor 2 and shaft with slots 13 on the rotor 2 for seals to reciprocate through.

Figure 11:
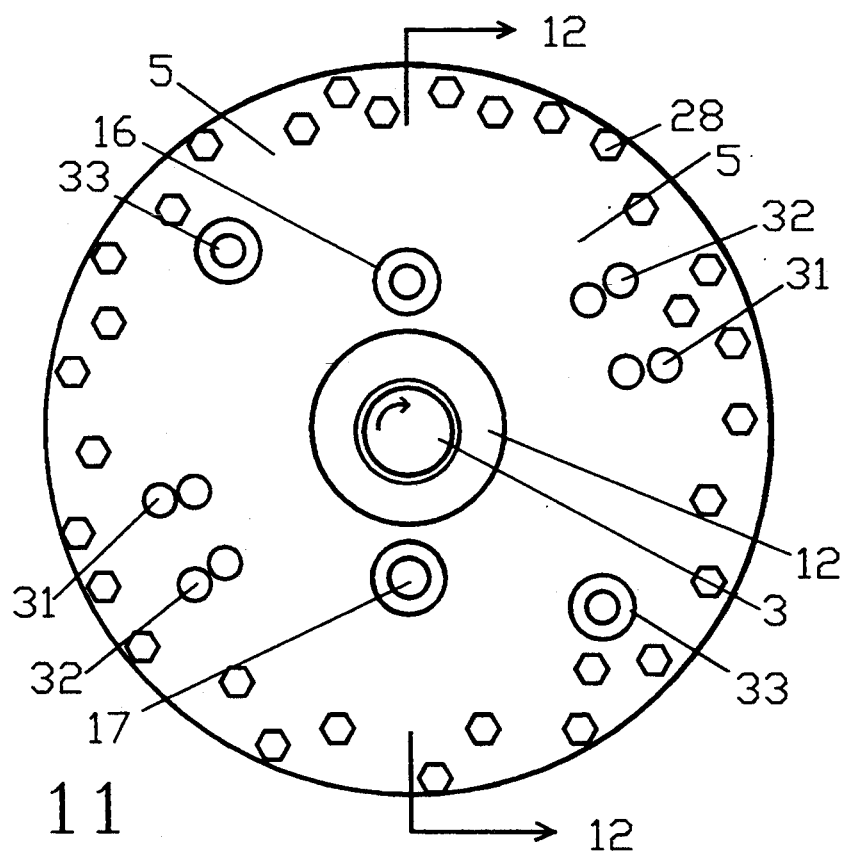
FIG. 11 is a front view of a 4 cycle, 4 cylinder single engine.
Figure 12:
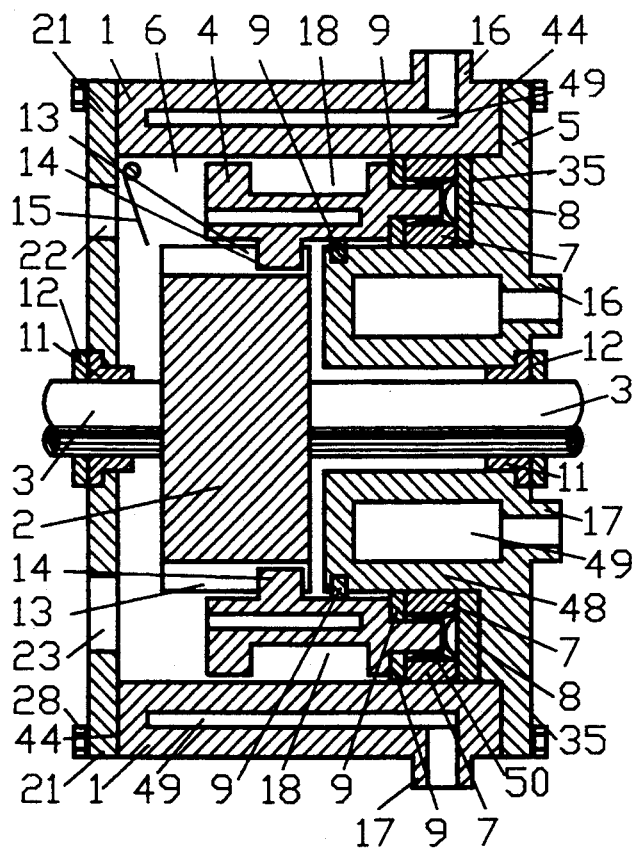
FIG. 12 is a sectional view of FIG. 11, a 4 cycle, 4 cylinder single engine.
Figure 13:
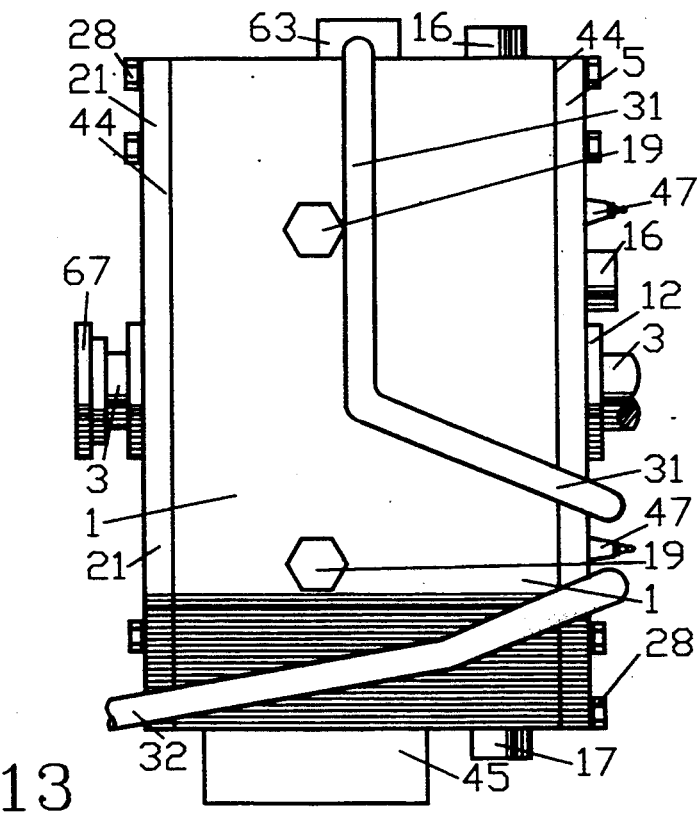
FIG. 13 is a side view of FIG. 12, a 4 cycle, 4 cylinder single engine.

Referring to FIG. 11, 12 and 13 which are a front, sectional and side view of a 4 cycle, 4 cylinder single engine which has a posterior compression chamber 6 with an intake 22 with a one way valve 15 and an outlet 23, otherwise it is similar to a single engine of a 4 cycle double engine. FIG. 13 which is a side view of a 4 cycle, 4 cylinder single engine which has a carburetor 63, intake pipes 31, exhaust pipes 32, spark plugs 47, posterior wall 21, bolts 19 for guide bearing, a coupling 67 and oil pan 45.

Figure 14:
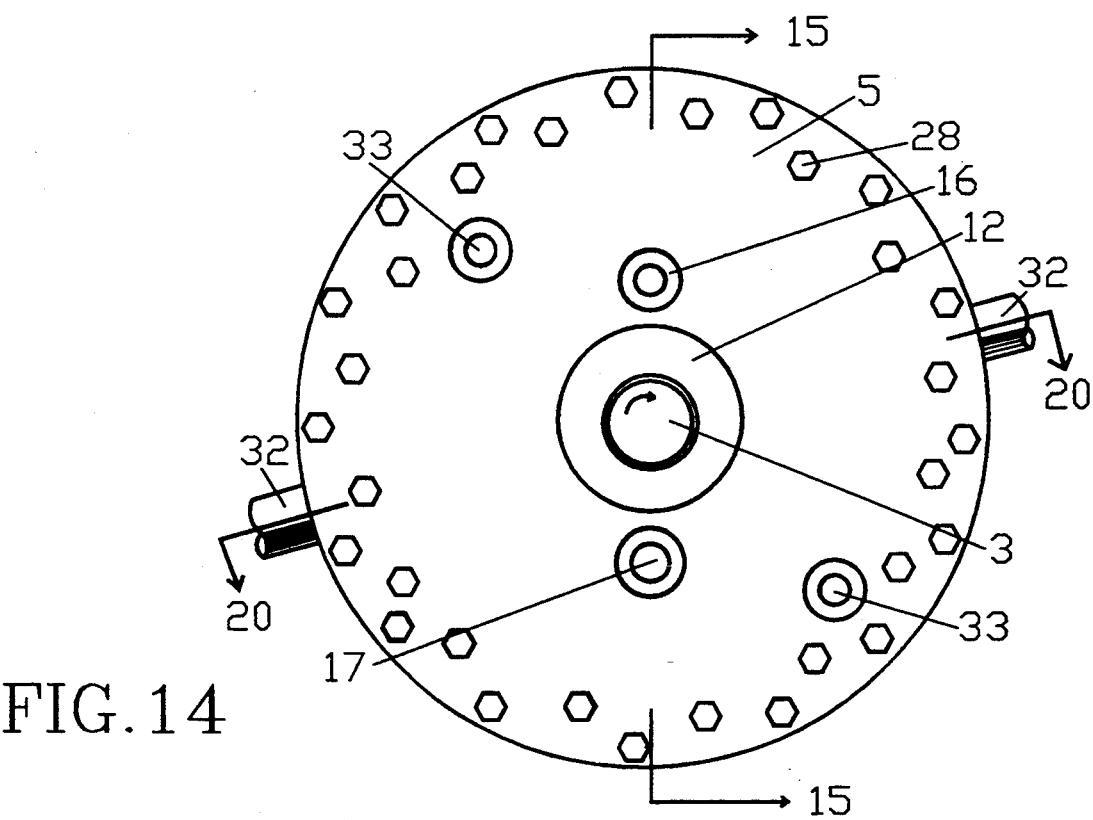
FIG. 14 is a front view of a 2 cycle, 2 cylinder single engine.
Figure 15:
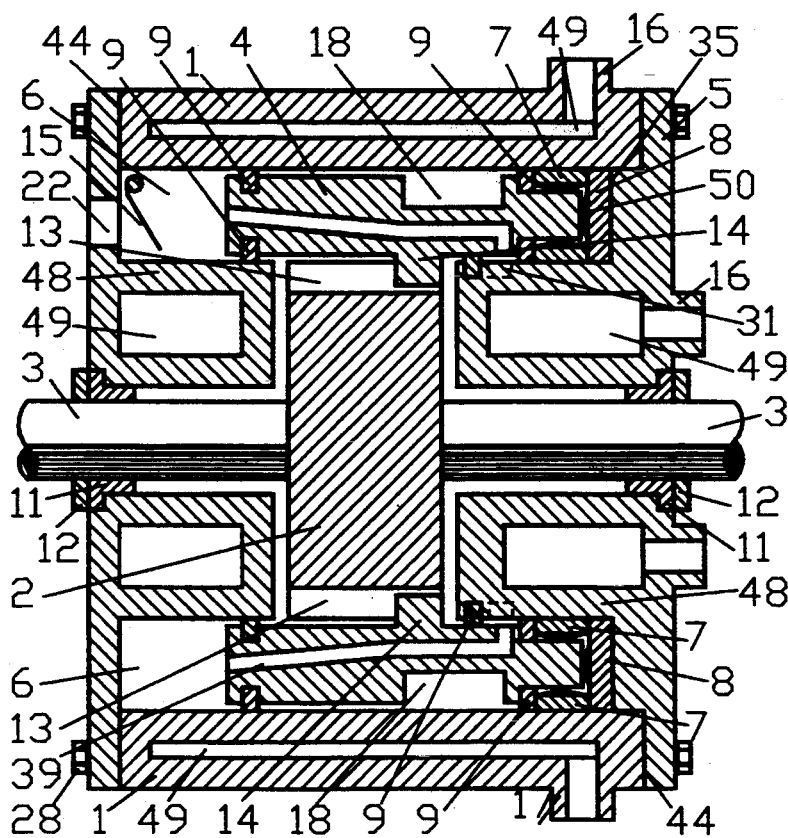
FIG. 15 is a sectional view of FIG. 14, a 2 cycle, 2 cylinder engine.
Figure 16:
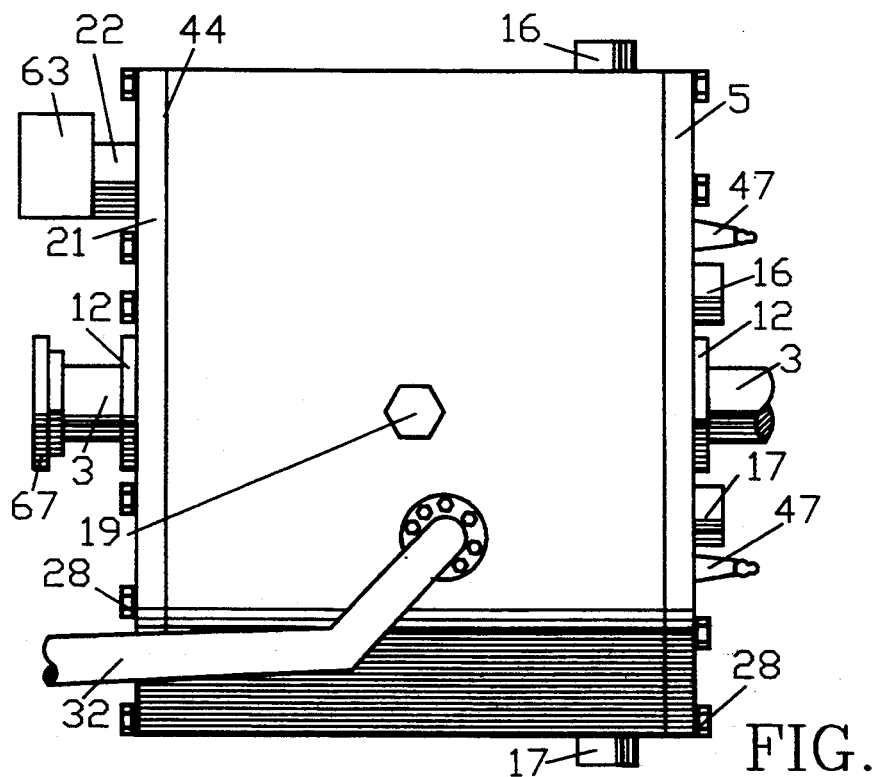
FIG 16 is a side view of a 2 cycle, 2 cylinder double engine.

Referring to FIGS. 14, 15, and 16 which is a frontal, sectional and side view of a 2 cycle, 2 cylinder single engine which is similar to a 4 cycle, 2 cylinder single engine or a 4 cycle double engine wherein only one engine is utilized for ignition and the other engine used for compression. FIG. 1 shows the posterior compression chamber which vacuums in a gaseous air mixture through inlet 22 which has a one way valve 15 and passage through a passage way 39 through the center of the piston 4 to passage 31 which opens to cylinder chambers 35 when the cylinder is fully expanded (dead center). FIG. 16 illustrates the position of the exhaust ports 32 and pipe, the bolt 19 holding the guide bearing, the carburetor 63, posterior or wall 21 with the inlet 22, the spark plugs and coupler 67.

Figure 17:
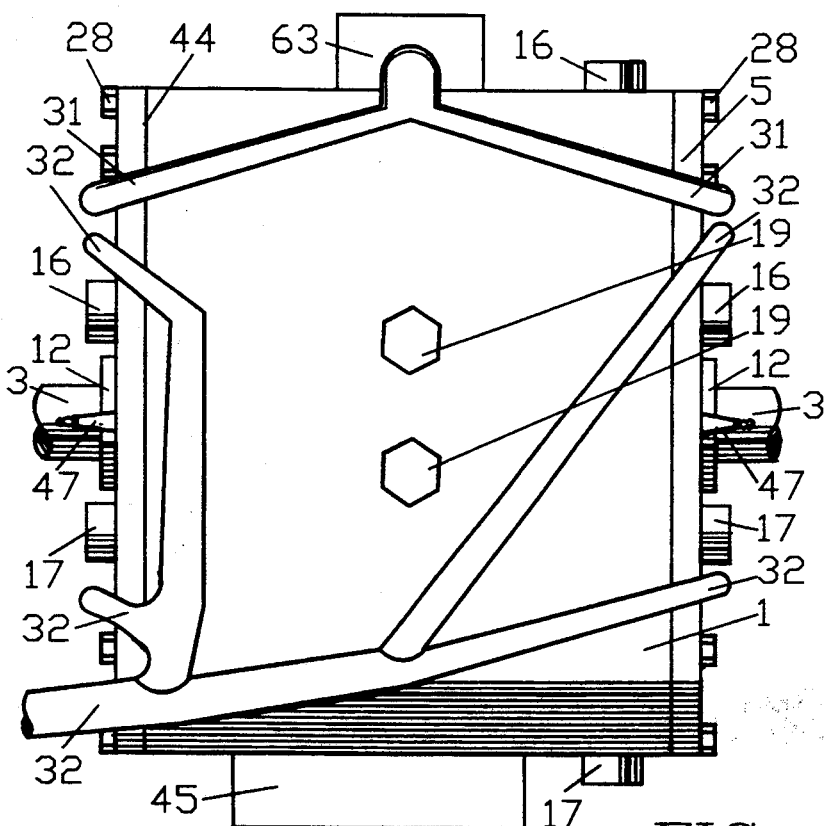
FIG. 17 is a side view of FIG. 2, a 4 cycle, 6 cylinder double engine.

Referring to FIG. 17 which is a side view of FIG. 2, which is a 4 cycle, 6 cylinder double engine which shows the side walls (heads) 5, 5a, the exhaust pipes 32, the intake pipes 31, the carburetor 63, the spark plugs 47, the oil pan 45, the bolts 19 for the guide bearings, the shaft 3, the housing 1, and the inlet 17 and outlet 16 coolant ports.

Figure 18:
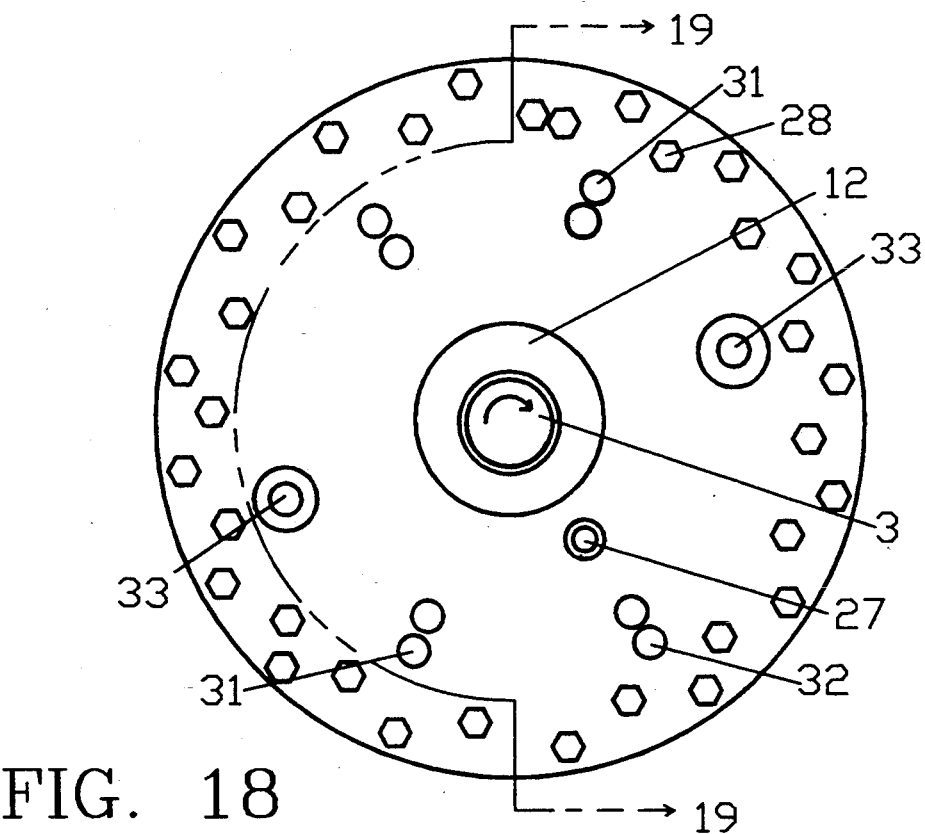
FIG. 18 is a frontal view of a 4 cycle, 4 cylinder double engine.

Referring to FIG. 18 which is a frontal view of a four cycle, four cylinder double engine showing the heads 5, shaft 3, spark plugs 33, exhaust ports 32, inlet port 31, coolant intake 17 and outlet 16, and oil line 27.

Figure 19:
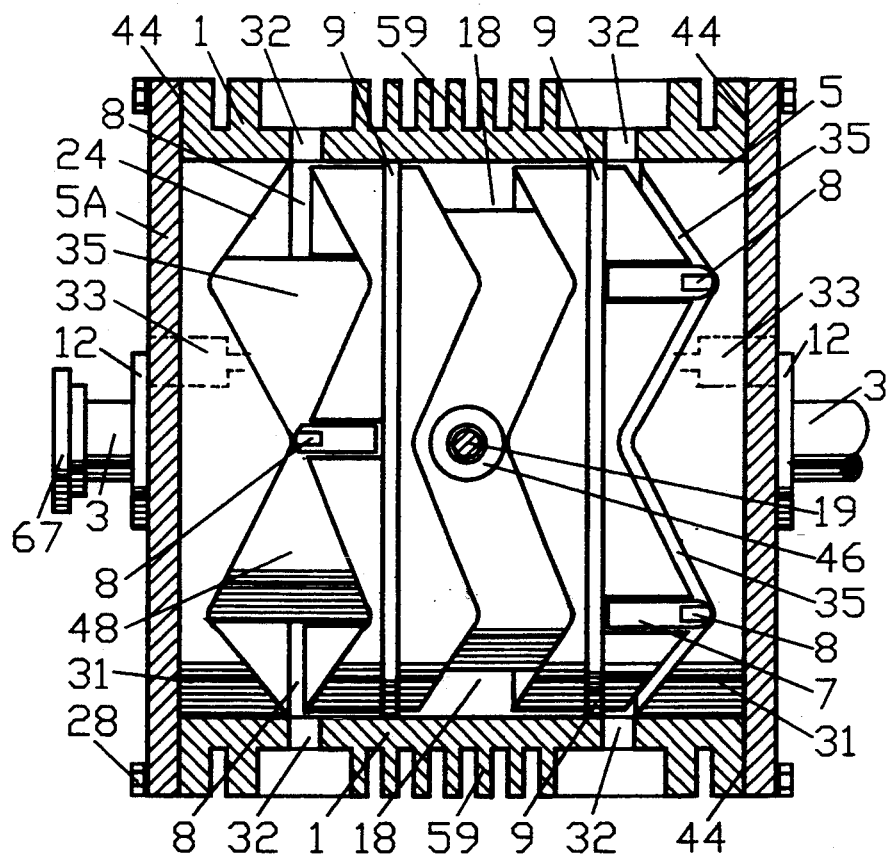
FIG. 19 is a sectional view of a 4 cycle, 4 cylinder double engine showing the guiding system, cooling fins and exhaust ports in the housing.

Referring to FIG. 19 which is a four cycle, four cylinder engine with the housing removed to show the rotary-reciprocal guiding system with its wavy groove 18, bearing 46 which is bolted to the housing by bolts 19. The sealed cylinder chambers 35 on the left side are expanded and compressed on the right side; also it shows the rotor 2, seals 7,8, rings 9, spark plugs 33, intake 31, exhaust 32, inner circular wall 48, heads 5, 5A coolant system 49 and housing 1.

Figure 20:
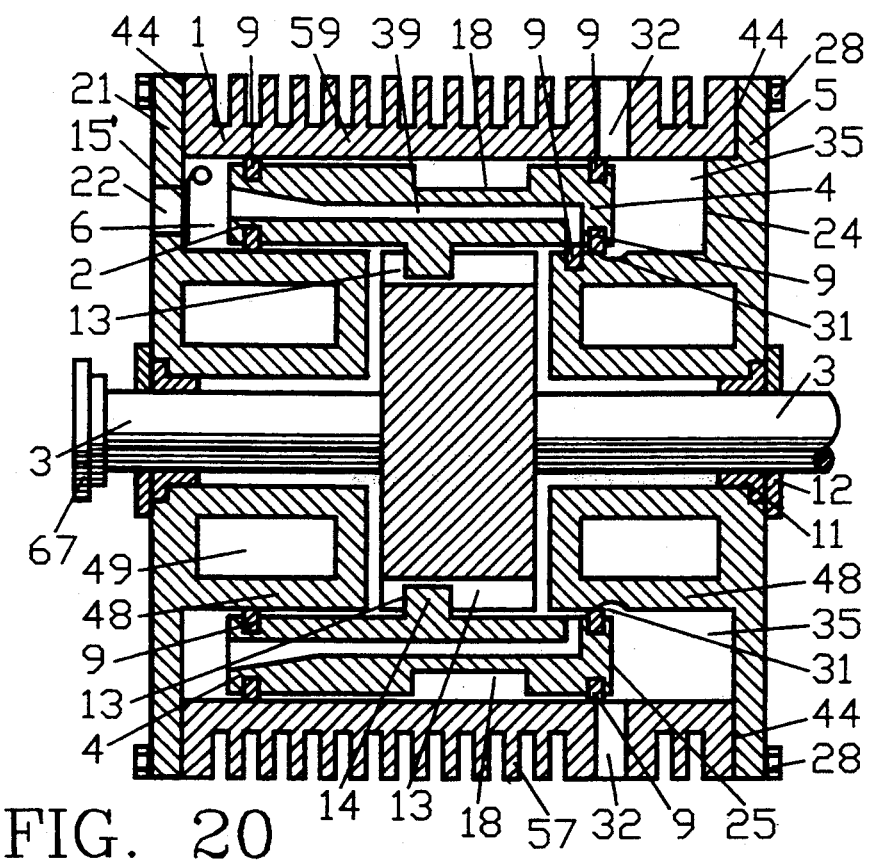
FIG. 20 is a sectional view of FIG. 14, a 2 cycle, 2 cylinder single engine with housing containing cooling fins and exhaust ports.

Referring to FIG. 20 which is a sectional view of FIG. 14, a two cycle, two cylinder single engine with exhaust ports 32 and cooling fins 59 in the housing 1, piston 4 has seals 7,8, rotary and reciprocal guide groove 18, rings and intake passage 39, heads 5, 5A, rotor 2 with groves 13 for the projecting teeth 14 from the piston and a shaft with a coupler 67 to couple together two or more engines to make a multiple engine.

Figure 21:
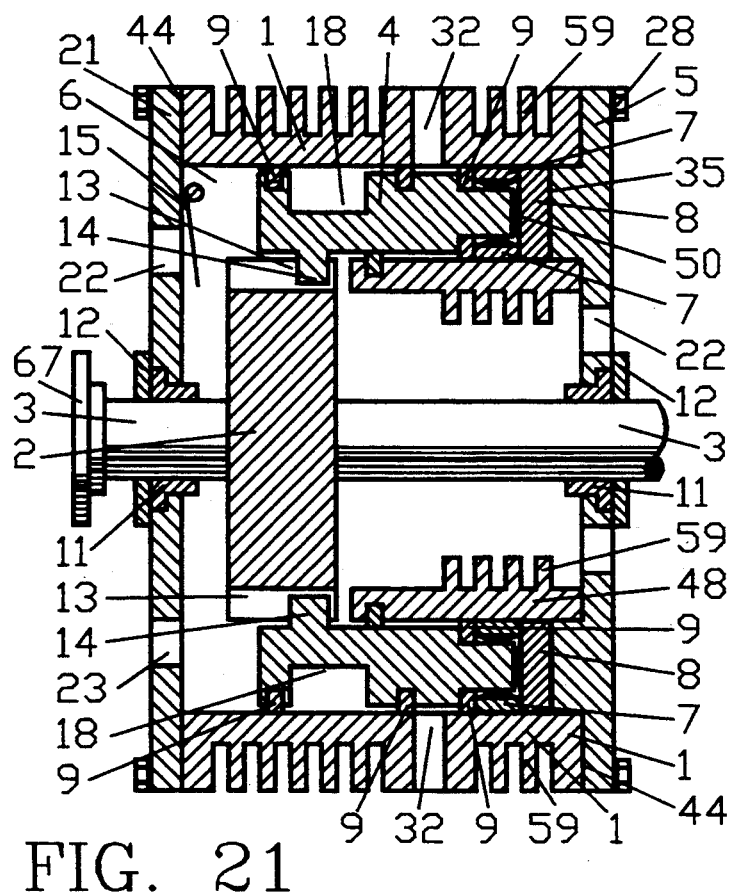
FIG. 21 is a sectional view of FIG. 11, a 4 cycle, 4 cylinder single engine with housing containing cooling fins and exhaust ports.

Referring to FIG. 21 which is a sectional view of FIG. 12, a four cycle, four cylinder single engine showing the housing 1 with cooling fins 59 and exhaust ports, the piston 4 with rotary and reciprocal guide groove 18, seals 7,8, rings 9, and projecting teeth 14, rotor 2 with grooves 13 for the piston's teeth to pass through and connecting to a shaft 3 with a coupler 67, a head 5, a compression chamber 6, a back wall 21 with inlet 15 and outlet 23.

Figure 22:
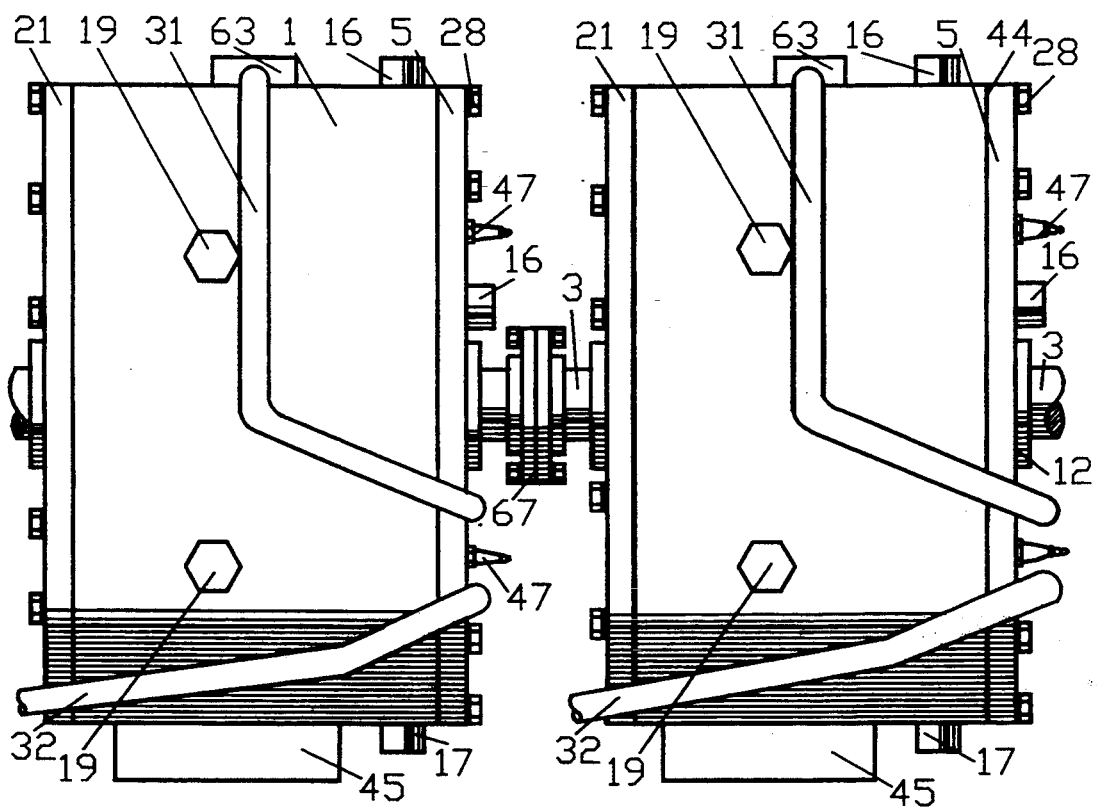
FIG. 22 is a side view of 2 couplers connected to shafts connected together to form a multiple engine.

Referring to FIG. 22 which is a side view of two couplers 67 on a shaft 3 connected together to form a multiple rotary reciprocal engine.

OPERATION

The 4 cycle, 6 cylinder rotary-reciprocal double engine of FIG. 1 and 2 with rotor 2 rotating in the clockwise direction and starting from the position of the piston 4 illustrated in FIG. 2 is in position wherein the waved front portion 24 of the piston 4 are in place between arcuate recesses 25 of the engine head 5 and the cylinder chambers 35 spaces is at its minimum volume, the piston 4, controlled by means of the stationary rotary-reciprocal guide bearing which is in contact with the waved side wall of the rotary-reciprocal guide groove 18 and has the same shape as the waved front surface of the piston 24. The piston 4 encloses together with the contact or runner surface of the engine housing 1 a working or combustion space 35 which increases during further rotation and reciprocation of the piston 4 in the clockwise direction and, for example, compresses the fuel-air mixture which has been previously vacuumed in from the carburetor as the piston is rotated 60° and reciprocated increasing the volume of the cylinder chamber 35 then as the piston is further rotated 60° and reciprocated in the opposite direction the volume of the cylinder chamber is decreased and the gaseous-air mixture is compressed. This compression of the gaseous-air mixture takes place in two cylinder chambers 35, then two spark plugs 47 in opposite spark plug ports 33 ignite the compressed gases and the pressure from the hot gases on the piston 4 rotates the piston 4, rotor and shaft 60° while reciprocating the piston 2 to dead center (maximum expansion of cylinder chamber). At the same time that the above gaseous-air mixture is being compressed, a gaseous-air mixture is being vacuumed in from the carburetor through the inlet port 31 into two opposite cylinder chambers 35a of the other engine; then when the compressed gaseous-air mixture is ignited in the above cylinder chamber 35 and it expands, the gaseous-air mixture in the opposite 2 cylinder chambers 35a is compressed. The compressed gaseous-air mixture in the opposite two cylinder chambers 35 a is ignited and expands and the pressure rotates the piston 4, rotor 2 and shaft 3 for 60° and reciprocates the piston 4, and when the ignited cylinder chamber 35 a expands it pushes out the exhaust gases from two of the opposite cylinder chambers 35 and compresses a gaseous-air mixture in two other cylinders chambers 35. There is a stroke of expansion and compression in one cylinder chamber in each engine which is not utilized but may be utilized to compress air, recompress a diesel-air mixture or other uses and it also allows the exhaustion to take place in one cylinder and the intake of gaseous-air mixture in another cylinder chamber. There are 6 ignitions involving two engine or a total of 12 ignitions per revolution. There are 24 cylinder chambers ignited per revolution.

A 4 cycle, 6 cylinder rotary-reciprocal single engine operates basically as the above 4 cycle, 6 cylinder rotary-reciprocal double engine except there is no opposite engine to rotate and reciprocate the piston in the function of compression and exhaustion. The momentum of the rotating piston and the rotor is utilized to do the function of compression and exhaustion. The gaseous-air mixture is vacuumed in through the carburetor and inlet port 31 to two cylinder chambers which are then rotated 60° and the gaseous mixture is compressed in 2 cylinder chambers 35 with spark plugs 47. The compressed gaseous-air mixtures are ignited and the pressure from the expanding gas rotates the piston 4, rotor 2 and shaft 60°, and in 2 other cylinder chambers 35 the expansion creates a vacuum which draws in a gaseous mixture from the carburetor. On further rotation of 60° the gaseous-air mixtures are compressed and in two ignited cylinders the exhaust gases are exhausted through the exhaust port 32 and the piston 2 is reciprocated and rotated. The rotary and reciprocal motions are guided by a rotary reciprocal guide groove 18.

A two cycle, 2 cylinder rotary-reciprocal engine has the basic design of a 4 cycle double rotary engine except that the second engine is utilized to vacuum in a gaseous-air mixture into the compression chambers 6 which is then compressed by the force of hot gases in the ignited cylinder chamber 35 of the other engine producing a rotation of the piston, rotor and shaft 90° to dead center. The exhaust ports 32 and intake ports are located in the housing at the level of dead center. The exhaust port is in the housing's peripheral wall and the intake port is in the inner peripheral wall. The compressed gaseous mixture has a passage way to the inlet ports 31. The inlet ports 31 and the exhaust ports 32 are opened when the piston reaches dead center. The compressed gaseous mixture flows into cylinder chamber 35 and assist in pushing the exhaust gases out through the exhaust ports 32. The piston, rotor and shaft is then rotated 90° and the piston is reciprocated by the force of the rotary motion of the rotors 2. This rotation produces a compression of the gaseous mixture in the two cylinder chambers 35 which is then ignited by spark plugs in each cylinder head 5. The engine has two ignitions in each cylinder chamber 35 per revolution. In a two cycle engine all the cylinder chambers of the functioning engine are ignited at the same time. In a two cycle, 3 cylinder engine there are three ignitions per revolution. In a 2 cycle, 4 cylinder engine there are four ignitions per revolution.

It will be understood that various changes and modifications may be made in the constructions describes which provide the characteristics of this invention without departing from the spirit thereof particularly as defined in the following claims.

I claim:

1. A rotary-reciprocal combustion engine having a cycle which includes intake, compression, expansion and exhaustion, said engine comprising:

a) a housing formed with a peripheral wall with two side walls, a rotor and piston in said housing, the inner surface of said housing's peripheral inner wall being cylindrical, said housing having laterally and peripherally spaced cylinder chambers formed with walls consisting of the inner cylindrical surface of the peripheral housing wall, a peripheral area of one side wall and inner circular wall or walls, said inner circular wall or walls are attached to said one side wall of the housing and extending parallel with the peripheral wall of the housing toward the center of the housing thereby leaving space in the housing for the rotor to rotate, said one or both side walls having equally spaced arcuate recesses projecting into the cylinder chambers, said housing having room for the piston to reciprocate in the cylinder chamber and said housing being provided with means for admitting a gaseous-air mixture communicating with said cylinder chamber, means for discharging combustion products communicating with said cylinder chambers;

b) said rotor having means for said piston to reciprocate across the peripheral area of said rotor while rotating with the rotor, the rotor is attached to a shaft in the center of the rotor, the rotor is rotatably mounted in said housing;

c) said shaft; mounted in the center of the housing, passing through the center of said rotor, rotates with said rotor and extending through the side wall of the housing;

d) said piston has a peripheral wall, an inner peripheral wall and is cylindrical, has one or two side walls with one or both said side walls having equally spaced waves, said waves being of equal number and shape of said arcuate recesses, wherein the number of arcuate recesses is greater than two, the piston having means to divide the housing cylinder chambers into two or more sealed cylinder chambers and has means to reciprocate while rotating with the said rotor, said piston is rotatably and reciprocally mounted in said cylinder chambers and reciprocally mounted on the peripheral area of said rotor and rotates with said rotor;

e) a reciprocal and rotary guide having means to guide the rotary and reciprocal motions of the piston while keeping the said piston in continuous sealing contact with said cylinder chamber walls and varying the volume of the cylinder chambers enabling a compression of a gaseous-air mixture to take place after aspirating a gaseous-air mixture;

f) an ignition system having means for igniting compressed gaseous-air mixture and expansion of said cylinder chambers due to pressure of said combustion products.

2. The rotary-reciprocal combustion engine of claim 1 wherein the arcuate recessed wall of said housing is provided with exhaust ports which have one way valves extending there through and is provided intake ports which have one way valves extending there through said ports being adapted to be opened or closed by said piston during rotation and reciprocation and constituting said means for admission of combustion mixture and means for discharging the combustion products.

3. The rotary-reciprocal combustion engine of claim 1 wherein the combustion fuel is injected directly into the cylinder chambers containing compressed air after the compression stroke and before ignition by means of a direct injection system.

4. The rotary-reciprocal combustion engine of claim 1 wherein the engine is cooled by a liquid cooling system.

5. A rotary-reciprocal combustion engine having a cycle of two strokes, compression and expansion wherein exhaust and intake takes place at the end of the expansion stroke; said engine comprising;

a) housing formed with a peripheral wall with side walls, a rotor and piston in said housing, the inner surface of peripheral wall being cylindrical, said housing having laterally and peripherally spaced cylinder chambers formed with walls consisting of the inner cylindrical surface of the peripheral wall, a peripheral area of one side wall and an inner circular wall attached to said side wall of the housing and extending parallel with the peripheral wall of the housing toward the center of the housing thereby leaving space in the housing for said rotor to rotate, said one side wall having equally spaced arcuate recesses projecting into the cylinder chambers, said housing having a posterior compression chamber separated by the rotor and piston and being provided with means for admitting a gaseous mixture communicating with said cylinder chambers, means for discharging combustion products communicating with said cylinder chambers;

b) said rotor having means for said piston to reciprocate across the peripheral area of the rotor while rotating with the rotor, said rotor is attached to a shaft in the center of the rotor and rotates with the shaft, said rotor is rotatably mounted in said housing;

c) said shaft mounted in the center of housing passing through the center of said rotor, rotating with the rotor and extending through the side walls of the housing;

d) said piston has a peripheral wall, an inner peripheral wall and is cylindrical, has side walls with equally spaced waves, said waves being of equal number and shape of said arcuate recesses are greater than two, the piston having means to divide the housing's cylinder chambers into two or more sealed cylinder chambers and has means to reciprocate while rotating with said rotor, said piston is rotatably and reciprocally mounted in said cylinder chambers and reciprocally mounted on the peripheral area of said rotor and rotates with said rotor;

e) a reciprocal and rotary guide having means to guide the rotary and reciprocal motions of the piston while keeping the said piston in continuous sealing contact with said cylinder chamber walls and varying the volume of the cylinder chamber enabling a compression of a gaseous-air mixture to take place after aspirating a gaseous-air mixture;

f) an ignition system having means for igniting compressed gaseous-air mixture and expansion of said cylinder chambers due to pressure of said combustion product.

6. The rotary-reciprocal combustion engine of claim 5 wherein compressed air from the compression chamber is injected into the intake port at the end of the expansion stroke and an air-assisted gaseous mixture is injected directly into the cylinder chamber after the exhaust port is closed.

7. A double rotary-reciprocal combustion engine having a cycle includes the four strokes of intake, compression, expansion and exhaust, said engine comprising;

a) a housing with a peripheral wall with side walls, the inner surface of said peripheral wall being cylindrical, a rotor in said housing, said housing having bilateral inner circular walls and peripherally spaced cylinder chambers wherein are formed wails consisting of the inner circular surface of the peripheral housing wall, a peripheral area of one side wall and one of the bilateral inner circular walls each attached to different wall of the housing and both extending parallel with the peripheral wall toward the center of the housing thereby leaving space in the middle of the housing cavity for the rotor to rotate, both side walls having equally spaced arcuate recesses projecting into the cylinder chambers with maximum arcuate recessed area of the arcuate recesses on one side wall of the housing being directly opposite to the maximum arcuate recessed area of the arcuate recesses on the other side wall of the housing, being provided with means for admitting a gaseous-air mixture communicating with one or more of the sealed cylinder chambers on each side, means for discharging combustion products communicating with one or more of the sealed said cylinder chambers on each side;

b) said rotor having means for a piston to reciprocate across the peripheral area of the rotor while rotating with the rotor, said rotor is attached to a shaft in the center of the rotor and rotates with the shaft, said rotor is rotatably mounted in said housing;

c) said shaft mounted in the center of housing passing through the center of said rotor, rotating with said rotor and extending through the side wall of the housing;

d) said piston has a peripheral wall, an inner peripheral wall and is cylindrical, side walls with equally spaced waves, said waves being of equal number and shape of said arcuate recesses, wherein the number of arcuated recesses are greater than two, the piston having means to divide the housing's cylinder chambers into two or more sealed cylinder chambers and has means to reciprocate while rotating with said rotor, said piston rotatably and reciprocally mounted in said cylinder chambers and reciprocally on the peripheral area of said rotor and rotates with said rotor;

e) a reciprocal and rotary guide having means to guide the rotary and reciprocal motions of said piston while keeping the said piston in continuous sealing contact with said cylinder walls and varying the volume of the cylinder chamber enabling a compression of a gaseous-air mixture to take place after aspirating a gaseous-air mixture;

f) an ignition system having means for igniting compressed gaseous-air mixture and expansion of said cylinder chambers due to pressure of said combustion products.

8. The rotary-reciprocal combustion engine of claim 7 Wherein the peripheral wall of said housing is provided with exhaust ports extending there through and the cylindrical inner wall of said housing with intake ports extending there through, said ports being adapted to be opened or closed by said piston during rotation and reciprocation and constituting said means for admission of combustion mixture and means for discharging the combustion products.

9. The rotary-reciprocal combustion engine of claim 7 wherein the combustion fuel is injected directly into the cylinder chamber containing compressed air after the compression stroke and before ignition by means of a direct injection system.

10. The rotary-reciprocal combustion engine of claim 7 is cooled by air flowing over cooling fins.

11. The double rotary-reciprocal combustion engine of claim 7 wherein two or more of the engine's shaft are attached together thereby forming a multiple engine.

* * * * *